INVENTORS
CHARLES E. SLYNGSTAD
ROLAND L. NAGY
BY G. H. Palmer
ATTORNEY
Carl D. Farnowitz
AGENT Sept. 11, 1962 C. E. SLYNGSTAD ETAL 3,053,753
HYDROCARBON CONVERSION APPARATUS AND METHOD OF OPERATION
Filed Oct. 16, 1959 2 Sheets-Sheet 2

*INVENTORS*
CHARLES E. SLYNGSTAD
ROLAND L. NAGY
BY
ATTORNEY
AGENT

United States Patent Office 3,053,753
Patented Sept. 11, 1962

3,053,753
HYDROCARBON CONVERSION APPARATUS
AND METHOD OF OPERATION
Charles E. Slyngstad, Rutherford, and Roland L. Nagy, Clifton, N.J., assignors to The M. W. Kellogg Company, Jersey City, N.J., a corporation of Delaware
Filed Oct. 16, 1959, Ser. No. 846,932
18 Claims. (Cl. 208—78)

This invention relates to improved apparatus and methods of employing the apparatus to effect contact of gasiform materials with fluidized finely divided solid contact material. More particularly, the invention is directed to an improved arrangement of apparatus for handling finely divided solid contact material therein and cyclically flowing the finely divided contact material through a system including hydrocarbon conversion, stripping and regeneration whereby the solids are contacted with gaseous, vaporous and/or liquid materials.

In a preferred embodiment the invention is directed to improved catalytic conversion apparatus and/or systems wherein a reactor vessel and stripping vessel are coaxially aligned and supported above a regeneration vessel such that finely divided solid contact material is conveyed substantially vertically through a plurality of suitably arranged conduits for the transfer of the finely divided solid material between vessels. The arrangements of apparatus described herein provides the refiner with a versatile apparatus which maximizes flexibility of operation for contacting a wide variety of hydrocarbon reactant materials under controlled conditions and is of prime importance in this respect in order to recover maximum yields of desired products.

It is an object of this invention to provide an improved arrangement of apparatus for cyclically circulating finely divided solid contact material in a fluid-like condition such that there is provided a system of maximum versatility of operation for contacting the solid material with gasiform material.

It is another object of this invention to provide a system optimizing the refiner's control on the severity of operation and maximizing the recovery of desired products when converting hydrocarbon materials in the presence of finely divided catalytic material to desired products.

The present invention applies and is particularly directed to apparatus for handling finely divided contact material and the methods of operation for effecting conversion of similar or segregated fractions of hydrocarbon feed materials such as gas oils, topped crudes, residual oils, and other high-boiling hydrocarbon fractions often referred to as reduced crudes or combinations of these materials in the presence of finely divided solid contact material maintained in suspension either as a relatively dilute phase suspension and/or a relatively dense phase suspension, depending upon the severity of operation desired.

Difficulties encountered today in the conversion of hydrocarbons boiling in the gas oil boiling range and particularly higher boiling materials are most usually related to the apparatus employed, the versatility of the apparatus to permit controlling the severity of operating conditions over a wide range and the conversion of different feed materials under optimum conditions to maximum yields of desired products. The ability of a refiner today to employ a single unitary apparatus and control the degree of conversion of a particular feed or a variety of different feed materials as desired has become increasingly important and takes on added significance when treating gas oil boiling range materials and particularly higher boiling range materials such as topped and reduced crudes or residual oils. These materials including gas oils, residual oils and reduced crudes contain constituents which are difficult to vaporize at the temperature and oil partial pressure conditions employed during conversion thereof which contribute to operating difficulties when employing finely divided solid contact material. These non-vaporous or liquid-like constituents present in the feed contribute to the formation of relatively large agglomerants of finely divided solid material which will defluidize and upset the fluid operation, thereby requiring shut-down unless precautions are taken to avoid the same. In addition, considerable difficulty is experienced in uniformly distributing these high-boiling materials on the catalyst, controlling the severity of conversion, and controlling the time of contact of the feed with the catalyst such that conversion to desired low-boiling products is obtainable. Accordingly, the improved apparatus and the methods of operation described herein are directed to providing the refiner today with an apparatus of optimum flexibility and versatility for handling a wide variety of feed materials and which will overcome or substantially reduce most of the difficulties herein mentioned. Accordingly, the improved apparatus and methods of operation described herein employ when treating high-boiling hydrocarbon reactant materials either as a liquid and/or in a partially vaporized condition, depending upon the boiling range of the particular hydrocarbon being processed, a suitable gasiform diluent material to control the hydrocarbon partial pressure, as well as assist in break-up of the hydrocarbon feed into relatively fine droplets for more suitable distribution and intimate contact of the hydrocarbon feed with the finely divided solid contact material. This mixture of hydrocarbon reactant and gaseous diluent material is passed in contact with finely divided solid material at a desired elevated temperature to form a suspension of solids and hydrocarbon reactant. The suspension is then passed under selected conversion conditions upwardly through suitable riser-reactors which terminate in an enlarged disengaging or settling chamber wherein separation of finely divided contact material from gasiform material including products of reaction is effected by a reduction in the hydrocarbon partial pressure and vertical velocity of the mixture. As more fully described herein, the enlarged disengaging or settling chamber may contain a relatively dense fluidized bed of finely divided solid contact material wherein the riser-reactors may discharge in either the upper and/or the lower portion of the dense fluid bed or above the dense fluid bed of solid material. It is contemplated, therefore, in one embodiment of terminating one or more and at least one riser-reactor in the lower portion of the disengaging chamber with one or more reactor-risers terminating in the intermediate or upper portion of the disengaging chamber. The finely divided solid contact material or catalyst is employed in a relatively dense fluidized condition in the bottom or lower portion of the disengaging chamber superimposed by a relatively dilute phase of solids such that the upper level or meniscus of the dense fluid bed of catalyst may be below the discharge of all of the reactor-riser conduits or the upper level of the dense fluid catalyst bed may be raised above the discharge of the lowermost reactor-riser discharge, but below the discharge of one or more risers terminating in the intermediate or upper portion of the vessel. Accordingly, at least one reactor-riser may discharge directly into the lower portion of the dense fluid bed of catalyst with the remaining reactors discharging above the dense catalyst bed. When maintaining the upper level of the bed of contact material in the disengaging chamber below the discharge outlets of all the reactor-risers, separation of products of reaction from finely divided solid contact material discharged from the risers is effected in the large disengaging space by a substantial reduction in velocity of the discharged mixture, as well as a reduction in pressure whereby the catalyst settles out and forms a relatively dense bed of solid contact material therebelow which is maintained in a fluid-like condition. When the catalyst or bed of contact material is maintained at a level such that at least one or more reactor-risers discharge into the lower portion of the bed, the hydrocarbon reactant undergoes further conversion in the bed and passes upwardly therethrough eventually emerging from the upper level of the dense bed of solids as products of reaction which are removed from the upper portion of the reactor-disengaging chamber. In another embodiment, at least one riser may be employed as a heat supply for the stripper by passing regenerated catalyst without substantial temperature reduction through the riser to the stripping section. Accordingly, the enlarged chamber may be operated to perform many functions including conversion of hydrocarbon feed, separation of products of reaction from solid contact material and stripping of difficultly removed hydrocarbons from the solids. In a broad aspect, the enlarged chamber functions as a desorption chamber wherein adsorbed hydrocarbons are removed from the contact material by conversion to lower boiling range products and the action of a gasiform stripping agent. In the apparatus of this invention, the products of reaction and entrained solids are discharged from the upper end of the riser conduits through suitable openings or discharge means which may be a plurality of elongated slots or openings in the upper periphery of the riser or a deflector plate may be positioned above and spaced apart from the open discharge end of the riser. Any one of these arrangements will substantially alter the vertical velocity component of the suspension passing through the risers and assist in the separation of suspended or entrained solids from reaction products when discharged into the enlarged disengaging chamber mentioned under a reduced pressure. The hydrocarbons adsorbed on the catalyst are removed therefrom by reducing the partial pressure of the hydrocarbon, cracking and stripping with the severity of cracking being governed as desired, as herein discussed. The finely divided contact material or catalyst separated by settling from the hydrocarbon conversion products is passed to a suitable stripping zone wherein it is contacted with a gasiform stripping agent under elevated temperatures to remove additional adsorbed hydrocarbons from the contact material. In one embodiment of this invention the stripping chamber is confined wholly within the reactor disengaging chamber such that the stripping gas passed upwardly through the stripping chamber in contact with finely divided catalytic material is removed from the upper portion of the stripping chamber and above a dense fluidized bed of solids maintained in the reactor chamber surrounding the stripper.

In this particular embodiment the annular relatively dense bed of solid contact material surrounding the stripping chamber may be employed as a first stage stripping compartment from which the contact material is withdrawn and passed to the stripping compartment in substantially the center of the vessel for additional stripping with a suitable agent, or the annular relatively dense bed of contact material may be employed for the conversion of hydrocarbons such as recycle oil feed materials and other hydrocarbons. It is quite evident that no matter how the apparatus is employed, the operator has at his selection and command an unusually large number of combinations or arrangements of steps which he may employ for the successful conversion of hydrocarbons under a wide variety of operating conditions.

In another embodiment, the stripping chamber is positioned below and coaxially with the reactor disengaging chamber such that all of the stripping gas and stripped products of reaction will pass upwardly through the bed of contact material maintained in the disengaging chamber. In the latter embodiment this is particularly desirable for purposes of reducing the hydrocarbon partial pressure and to facilitate stripping of the hydrocarbon products from the contact material as rapidly as possible upon discharge from the riser-reactors thereby limiting conversion thereof and improving the coke to conversion ratio. In the embodiments described herein the catalyst or finely divided contact material passed to the stripper chamber moves generally downwardly as a fluidized mass countercurrent to stripping gas, which is introduced to the lower portion or bottom of the stripping chamber. Thereafter, the stripped catalyst enters a substantially vertical standpipe and is conveyed to the regeneration chamber positioned below the stripping chamber.

One of the most important aspects of the improved method and apparatus of this invention is directed to providing a system of sufficient flexibility to permit contact of hydrocarbon reactant materials with finely divided catalytic material under a wide variety of controlled conditions of severity to permit conversion of different feed materials into desired products and the recovery of hydrocarbon products immediately thereafter before substantial additional conversion thereof. In any one of the systems herein discussed provisions are made for immediately stripping the catalyst discharged from the riser-reactors at temperatures which may be below, equal to or above the temperature employed in the riser-reactor with the strippers suitably baffled for intimate contact of catalyst with stripping gas.

The stripper chamber is provided with suitable baffle means which are preferably disc and donut shaped baffle members sloping downwardly and inclined at an angle of at least about 45° and preferably greater than the angle of repose of the catalyst in order to substantially reduce any tendency of the finely divided catalyst from accumulating and remaining on the upper surface of the baffle members. The baffle members employed in the apparatus of this invention may be solid impervious baffle members or the baffles may be partially perforated in the lower portion, preferably the middle third thereof to permit flow of gaseous material upwardly therethrough. It is important, however, to prevent the gaseous stripping material from channeling upwardly through the mass of catalyst and particularly adjacent to the stripper wall. It is contemplated within the scope of this invention of providing the stripping chamber with a plurality of spaced apart transverse baffle members for the purpose of segmenting the stripping chamber into a plurality of elongated separate stripping compartments, which arrangement effectively increases the length to diameter ratio (L/D) of the stripping compartment and further improves the efficiency of stripping obtained therein.

In another embodiment of the apparatus of this invention employing a plurality of riser-reactors, the stripping chamber is coaxially positioned with and beneath the enlarged disengaging or settling chamber between the plurality of riser conduits extending into the settling chamber such that the stripping chamber is an elongated cylindrical chamber of smaller diameter than the enlarged settling chamber. That is, the enlarged cylindrical settling or disengaging chamber is coaxially positioned above and in open communication with the cylindrical stripping chamber of smaller diameter with the enlarged cylindrical chambers being connected to the lower cylindrical stripping chamber by an inverted open end conical frustrum member. In this arrangement the riser conduits extend upwardly through the conical frustrum and terminate above the upper edge thereof and in the enlarged cylindrical settling chamber. Accordingly, the cylindrical stripping chamber is positioned beneath the disengaging chamber but above a regeneration chamber, with a substantial portion of the riser-reactors extending from the regenerator chamber to the settling chamber being exposed between the regenerator chamber and the conical frustrum and readily accessible to permit spaced apart addition of hydrocarbon reactant to the risers without the necessity of hydrocarbon feed conduits passing through the walls of the vessel or disengaging reactor chamber or the regenerator chamber. This particular arrangement of apparatus lends itself to good mechanical design and relatively easy fabrication of the apparatus. More important, however, it permits providing a plurality of feed inlets to the risers which are readily accessible. In this specific embodiment the feed may be introduced to the riser, just prior to its passing through the conical frustrum, immediately after the riser protrudes from the regenerator shell, as well as through suitable hollow stem plug valves aligned with the base of each riser-reactor. By providing the apparatus described herein such that hydrocarbon feed may be introduced to the riser-reactors through a plurality of separate and spaced apart feed nozzles at substantially the bottom, inermediate and upper portion of the riser-reactors, the operator may control the contact time between the hydrocarbon reactant and catalyst over a relatively wide range of contact time to obtain the desired conversion of any particular feed material. More specifically, when introducing the feed at the uppermost feed inlet point of the riser-reactor and maintaining the bed of catalyst in the reactor-disengaging chamber below the riser outlet, a relatively short contact time, less than a fraction of a second, is possible. When operating in this manner, a suitable gasiform lift medium will be employed to assist in conveying the catalyst or finely divided contact material upwardly through the lower portion of the riser to the point at which the feed is introduced. When introducing the feed near the intermediate portion of the riser-reactor a longer contact time will be provided with the maximum time within the riser being provided by introducing the fresh feed through the hollow stem plug valve at the base of the riser-reactor and having the riser terminate in the lower portion of a dense fluid bed of catalyst. When additional contact time is required for more severe conversion conditions, the depth of the bed of catalyst retained in the lower portion of the reactor disengaging chamber may be increased such that the upper level of the dense fluidized bed of contact material is above the riser-reactors discharge point. By this improved arrangement of apparatus the suspension of catalyst and hydrocarbon reactant material discharged from the riser passes into the lower portion of the bed of catalyst wherein it undergoes further conversion. For example, when employing the apparatus for the conversion of gas oil to primarily gasoline products and wherein higher boiling cycle oil must be subject to further conversion, the fresh feed will be introduced to the riser-reactors which terminate in the intermediate portion or above the dense bed of catalyst in the reactor disengaging chamber with the recycle oil feed being introduced to the riser-reactors which terminate in the dense bed of catalyst in the lower portion of the disengaging chamber. In another embodiment of this invention, hydrocarbon reactant may be passed through the riser-reactors which terminate above the upper level of the catalyst bed maintained in the disengaging chamber with regenerated catalyst passed with suitable lift gas through another riser-reactor as a means for controlling or raising the temperature of the stripping chamber, as desired. In the apparaus of this invention the plurality of riser conduits are substantially uniformly spaced around the cylindrical stripping chamber. When employing at least about four riser-reactors, the longest riser-reactor conduits will be positioned diametrically opposed to one another with the shortest riser conduits being positioned diametrically opposed to one another such that the riser-reactors are about 90° apart from one another. It can be seen from the above that the improved apparatus of this invention optimizes flexibility of operation for the conversion of similar or dissimilar hydrocarbon feed materials either together or separately under a relatively wide range of operating conditions.

The stripped contact material recovered in the lower portion of the stripping chamber may then be passed through one or more substantially vertical standpipes to a relatively dense fluidized bed of catalyst in an enlarged regeneration chamber positioned below the stripping chamber and coaxially aligned therewith. Positioned across the lower cross-sectional area of the regenerator chamber at substantially the maximum diameter thereof may be provided a suitably perforated member or distributor grid to assist in distributing regeneration gaseous material throughout the cross-sectional area of a relatively dense fluidized bed of catalyst or solids thereabove undergoing regeneration. It is contemplated employing a plurality of gaseous material distributor rings or distributor spiders either alone or in conjunction with the grid or partial grids.

In the method and apparatus of this invention the catalyst standpipe extending downwardly from the stripping chamber may terminate below or above the distributor grid and either in the lower or upper portion of the dense fluidized bed of catalyst, but below the upper dense phase level, for example, in the intermediate portion of the dense fluidized bed of catalyst in the regenerator. In one embodiment the standpipe is extended as low as possible into the regenerator and a substantially cylindrical baffle member is provided which extends upwardly from the bottom of the regenerator around the standpipe to provide for an annular upflow regenerator space through which the contaminated catalyst may be initially passed upwardly with a first portion of the regeneration gas with the partially regenerated catalyst being discharged from the annular riser either into or above the upper portion of a relatively large dense fluid bed of catalyst surrounding the annular upflow regenerator space. The relatively large annular bed of catalyst moves generally downward in a dense fluidized condition countercurrent to additional regeneration gas introduced to the lower portion of the bed whereby regeneration of the catalyst is more fully completed prior to being passed to the riser-reactors.

Aligned with the bottom open end of each standpipe is a suitably vertically movable plug valve for controlling the rate of flow of catalyst discharged from the base of the standpipe. Positioned in the lower portion of the regenerator and preferably beneath the grid, when a grid is employed, are suitable regeneration gas distributor rings or spiders for introducing regeneration gas to the lower portion of the bed of catalyst in the regeneration chamber. While it is preferred to employ a distributor grid in the lower portion of the regenerator chamber, it is not essential and the grid may be eliminated or the grid may be employed only in the space for the large bed of catalyst surrounding the annular regenerator space. Suitable catalyst withdrawal wells which are cylindrical wells are prefereably provided in the lower portion of the regenerator chamber wherein the riser-reactors originate. Regenerated catalyst withdrawn from the bed passes downwardly through the well as an annular stream countercurrent to fluffing or stripping gas introduced to the bottom of the well for removal of gaseous products of combustion and to assist flow of regenerated catalyst to the riser inlet. Thereafter, the regenerated catalyst enters the riser inlet wherein it is mixed with gasiform diluent material and/or hydrocarbon reactant introduced through suitable vertically movable hollow stem plug valves aligned with the bottom open end or inlet to the riser-reactors. In the regeneration chamber, adsorbed carbonaceous material remaining on the catalyst or solids as a result of the hydrocarbon conversion reaction is removed by burning in the presence of air or an oxygen-containing gas. During regeneration of the catalyst involving combustion of the carbonaceous material with oxygen, the catalyst or contact material is heated to an elevated temperature, generally in the range of from about 1050° F. to about 1250° F. and may be as high as 1400° F. The heated contact material is then passed to the hydrocarbon conversion step or riser-reactors to supply substantially all of the heat required to perform the desired conversion of the particular feed material being treated.

One of the important aspects of a hydrocarbon conversion process design employing finely divided catalytic material is related to the removal of adsorbed carbonaceous material from the catalyst and restore its activity sufficient for reuse in the conversion of hydrocarbons. The removal of carbonaceous material remaining on the catalyst recovered from the stripping operation is accomplished by burning with air or an oxygen-containing gas in a regenerator chamber under conditions to control the temperature of regeneration within desired limits, usually below about 1400° F. Thereafter the heated catalyst and/or solids is recycled to the hydrocarbon conversion step. However, the removal of these carbonaceous deposits from finely divided solid material suitable for use in a fluid catalytic conversion process has become a major problem of the refiner today because of the size of the apparatus employed, the quantity of catalyst used in the apparatus, the potential damage to the apparatus and catalyst by improper high temperature operating conditions, the necessity for more complete removal of carbonaceous deposits from the catalyst in a minimum of time to minimize the catalyst inventory of the system and the necessity of providing a more efficient regeneration technique. Accordingly, any improvements in the technique of regenerating catalyst which will overcome or substantially reduce the problems connected with the regeneration of catalyst becomes of major importance to the refiner today. With these problems in mind applicants have provided an improved arrangement of apparatus and operating technique for the regeneration of catalyst to substantially accomplish the above. Applicants have provided in one embodiment an improved method and means for regenerating catalyst accomplished by passing the contaminated catalyst discharged from the standpipe upwardly through a first annular chamber as a relatively dense fluidized mass of catalyst with a portion of the oxygen required to regenerate the catalyst and then discharging the partially regenerated catalyst from substantially the top of the first annular chamber into the top of a second annular chamber surrounding the first annular chamber wherein the catalyst moves generally downwardly as a relatively dense annular bed countercurrent to additional oxygen-containing regeneration gas introduced to the lower portion of said second annular chamber and beneath a distributor grid in the lower portion thereof. When operating in this manner it is important to limit the concentration of the oxygen in the regeneration gas to a value such that substantially complete consumption of oxygen will be obtained prior to the gas separating from the catalyst at the upper dense phase level thereof. The amount of oxygen introduced to the lower portion of the second annular bed should be similarly controlled, but sufficient to complete the removal of carbonaceous deposits to a desirable low value not removed in the first annular regeneration stage. Although the first annular regenerator chamber is shown to extend upwardly from the dish shaped bottom of the enlarged regeneration chamber, it is contemplated providing a longer contact time of regeneration gas with catalyst by extending the first annular chamber beneath the bottom of the enlarged regenerator chamber. This method of operation and arrangement of apparatus assures more complete and uniform contact of regeneration gas with contaminated catalyst thereby providing for more efficient use of the regeneration gas, more complete burning of carbonaceous deposits and therefore improved regeneration of the catalyst.

The improved arrangement of apparatus disclosed herein provides the refiner with unprecedented flexibility of operation by permitting the temperature of the riser-reactors to be independently controlled over a relatively wide range to accomplish a preferred conversion of a particular hydrocarbon feed material. When employing a dense fluidized bed of catalyst in the reactor-disengaging chamber to increase the severity of operation for a desired conversion, the temperature of the catalyst bed may be independently controlled by any one of the various methods herein discussed. That is, in prior art systems wherein the fresh feed riser-reactor is relied upon to carry all of the catalyst into the dense fluidized bed reactor, the temperature of the dense fluidized reactor is dependent upon the discharge temperature from the riser-reactor. However, in the embodiments presented herein, the riser-reactor temperature may be independently controlled and the dense fluidized bed temperature may be independently controlled by employing a riser to convey freshly regenerated catalyst directly to the dense fluid bed and therefore need not rely solely upon the discharge temperature of the contact material from the fresh feed riser-reactor which terminates most usually above the upper level of the dense fluidized bed for supplying heat to the dense fluid bed phase. Accordingly, here again the improved arrangement of apparatus provides additional versatility and flexibility in the method of controlling the desired degree of conversion of different hydrocarbon feed materials in the apparatus. To amplify this further, consistent with that hereinbefore described, the riser conduits are provided with a plurality of suitable feed inlet nozzle means for the separate and spaced addition of a hydrocarbon feed material to the reactor-risers. More specifically, when introducing hydrocarbon feed above the bottom of the riser conduit, suitable lift gas, such as steam, may be initially employed to facilitate flow of hot freshly regenerated catalyst upwardly through the riser-reactors to the point of hydrocarbon feed inlet. Generally, the feed nozzle will be of an atomizing type which will disperse the hydrocarbon feed as relatively fine droplets for more uniform and intimate contact with the catalyst or finely divided contact material passing through the risers. A suitable nozzle arrangement is one where the hydrocarbon feed is passed through an inner nozzle and mixed with a suitable diluent material, such as steam being passed through an annular nozzle at a relatively high velocity of at least about 80 ft./sec. surrounding the hydrocarbon feed nozzle to effect breakup of the hydrocarbon feed into fine droplets. Various other types of nozzles, of course, may be employed in the apparatus of this invention, provided they adequately disperse the hydrocarbon on the contact material. It is important, however, that the feed be introduced under conditions to avoid excessive catalyst attrition, as well as erosion of the riser-reactors at the point of hydrocarbon feed inlet.

In the conversion of high-boiling hydrocarbons, particularly residual oils, topped and reduced crudes with finely divided catalytic material, relatively large amounts of hydrocarbonaceous material comes in contact with and is deposited on the catalyst which must be removed by the combination of steps involving cracking to lower boiling vaporous products, stripping and regeneration. During the cracking and stripping operation the majority of the hydrocarbonaceous material adsorbed on the catalyst is removed, however, due to the nature of hydrocarbon feed materials there always remains on the catalyst a carbonaceous residue which must be removed by a more drastic treatment involving burning in the presence of air or an oxygen-containing gas, thereby heating the catalyst to an elevated temperature and suitably restoring the activity of the catalyst for recycle to the hydrocarbon conversion steps. It is important, therefore, to provide a system of regeneration which will provide substantially uniform burning of carbonaceous deposits, more effective removal of carbonaceous deposits from the catalyst and avoid localized hot spots which may damage the catalyst as well as the apparatus. A most suitable method to accomplish the above is the use of the two-stage fluid system herein disclosed. However, in all of these systems suitable means is required to assist in controlling regeneration temperatures within desired limits. Accordingly, as a means to assist in controlling regenerator temperatures within desired limits during combustion of the carbonaceous deposits, the regenerator is provided with a plurality of heat exchange coils which are arranged to lie within the dense fluidized bed of catalyst undergoing regeneration in the regeneration chamber through which a suitable cooling fluid is circulated. Although a wide variety of cooling coil arrangements may be provided and have been suggested in the prior art, it is preferred, in accordance with the apparatus of this invention, that the coils be of a bayonet type, which project into the catalyst bed and which may be individually controlled by suitable valves for circulating the cooling fluid. By the improved arrangement of independently controlled heat exchange coils, some may be employed for superheating steam, some for water vaporization and some may be used as a means for preheating oil feed.

The principal conditions of operation, such as time, temperature and pressure, governing the conversion of hydrocarbonaceous material in the presence of finely divided solid catalytic material to lower boiling range products and the regeneration of such solid catalytic material may be varied over a relatively wide range of conditions which will depend, for the most part, upon the type of hydrocarbon feed material being treated and the extent of conversion desired. It is applicants' desire to maintain the temperature of the regenerator in the range of from about 1000° F. to about 1400° F., and preferably from about 1050° F. to about 1150° F., with the riser-reactors being maintained at a temperature in the range of from about 800° F. to about 1050° F., and preferably from about 850° F. to about 1000° F. Generally, the relatively dense fluid bed of catalyst when employed will be at a lower temperature than the riser-reactor temperature and will be maintained in the range of from about 10° F. to about 200° F. lower than the riser temperature, usually from about 40° F. to about 100° F. lower than the riser temperature. However, as herein indicated, it is possible by the method and means of this invention to maintain the temperature of the bed at a higher temperature and of the order of about 10° F. to about 200° F. higher than, for example, the fresh feed risers. In addition to the above, and as indicated hereinbefore, the time of contact of the hydrocarbon feed with the catalyst is dependent upon the feed being employed and may be in the range of from a fraction of a second, say about 0.1 of a second to about 10 seconds, depending upon the refractiveness of the hydrocarbon treated, catalyst to oil ratio employed, as well as the temperature employed. It is contemplated, therefore, within the scope of this invention, of employing solid contact material to oil ratios in the risers within the range of from about 5 to about 25 to 1, and superficial gas velocities in the range of from about 10 to about 100 feet per second. Generally, the superficial gas velocities in the riser-reactors will be in the range of from about 15 to about 75 feet per second, with the velocities in the dense fluidized bed phase being maintained in the range of from about 1.0 to about 3.0 feet per second.

It is quite evident from the above that the improved arrangement of apparatus provides systems or methods of operation of maximum flexibility for the conversion of dissimilar hydrocarbon feeds either simultaneously or separately into desired products. In this connection it is contemplated introducing fresh gas oil feeds to the riser-reactors which extend above a dense fluidized bed of catalyst with recycle oil being introduced directly to the dense catalyst bed or the risers which terminate in the lower portion of the dense catalyst bed. In another embodiment, residual oils or reduced crudes may be introduced to the riser-reactors at any one of a multiplicity of feed inlets to accomplish a relatively short contact time or a longer contact time as desired with the products of reaction and catalyst being discharged into a disengaging chamber and above a dense fluidized mass of catalyst therein. In this latter arrangement, it is contemplated employing at least one riser for transfer of hot freshly regenerated catalyst in the absence of hydrocarbon feed to the stripping compartment for independently controlling the temperature of the stripping compartment.

The improved arrangement of apparatus of this invention may be used in a wide variety of chemical and petroleum processes wherein finely divided solid contact material is employed. Therefore, the finely divided solids utilizable in the apparatus of this invention are those which are capable of being regenerated, which substantially retain their solid subdivided state under the conditions to which they are exposed in the system and those which are relatively easily handled in the cyclic systems of the apparatus herein described. Those solids which are utilizable in the apparatus of this invention include naturally occurring or synthetically prepared cracking catalysts including Filtrol, kaolin, synthetically prepared silica and silica-alumina catalysts with or without additional promoters selected from the elements of groups III to VIII of the periodic table, either alone or in combination with one another.

In addition to the above, it is contemplated employing in the system of this invention finely divided solid inert material such as sand, pumice, spent cracking catalysts, clays, petroleum, coke, etc., either alone or in conjunction with the catalyst in suitable proportions. For example, a mixture of naturally occurring and/or synthetically prepared catalyst may be employed alone or with an inert diluent material such as sand may be employed in physical admixture with either naturally occurring or synthetically prepared silica-alumina catalyst. That is from about 50 percent to about 95 percent of finely divided solid relatively inert material may be employed in physical admixture with synthetically prepared silica-alumina cracking catalyst. In addition to the above, the finely divided solid contact material may be substantially inactive such as for example used cracking catalyst, coke or any other suitable material to which is added in physical admixtures fresh synthetically prepared silica-alumina catalyst in an amount of from about .5 pound to about 5 pounds per barrel of hydrocarbon feed to maintain the average catalyst activity at a desired value.

Having thus generally described the improved method and means of this invention, reference is now had by way of example to the drawings which present diagrammatically preferred arrangements of apparatus of this invention.

FIGURE 1 presents diagrammatically a substantially vertical and unitary vessel arrangement for cyclically circulating finely divided solid particle material through reaction compartments, a stripping compartment and a regeneration compartment wherein the stripping compartment is positioned below the reactor-disengaging compartment and above the regeneration compartment.

FIGURE 2 presents diagrammatically a substantially vertical vessel arrangement similar to that of FIGURE 1 except that the stripping compartment is confined within the reactor chamber.

Figure 1:
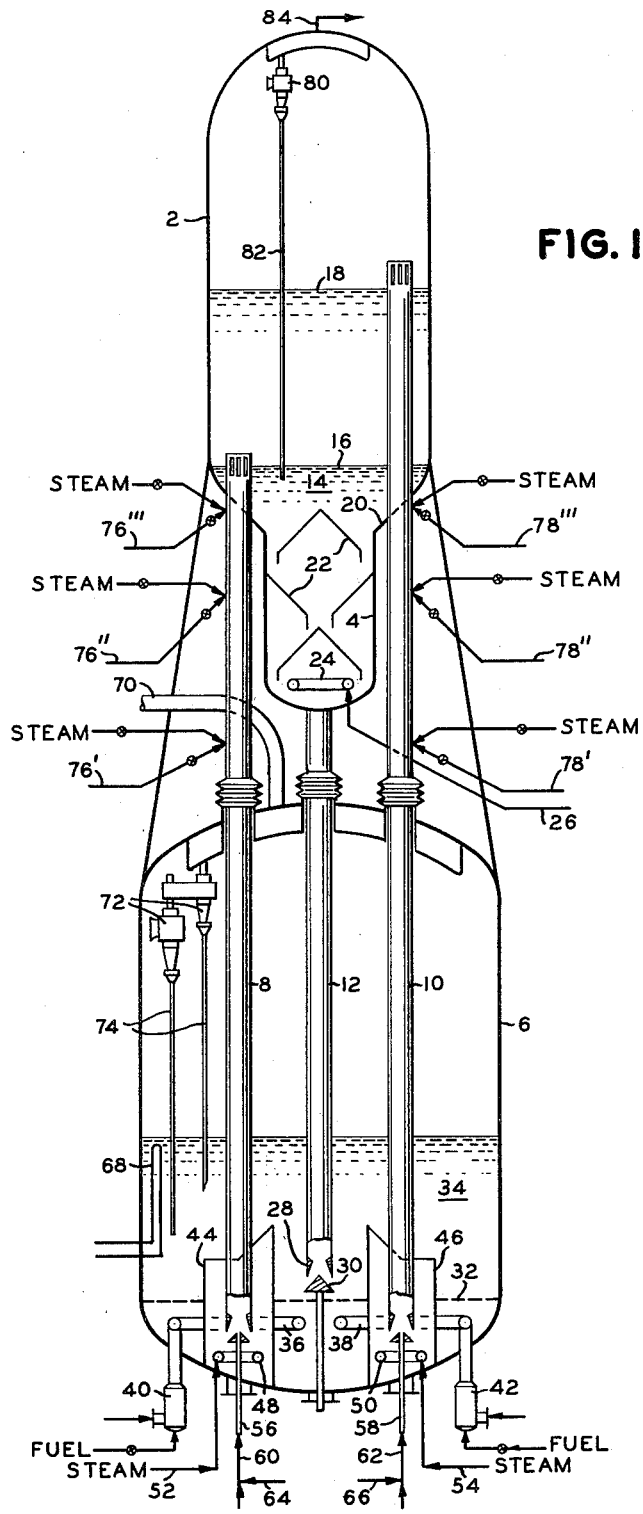

Referring now specifically to FIGURE 1 a substantially vertical and unitary vessel is shown having an upper reactor-disengaging chamber 2, an intermediate stripping chamber 4 and a lower regeneration chamber 6. Riser-reactor conduits 8 and 10 are provided for conveying regenerated finely divided catalytic material from the lower portion of the regeneration chamber 6 upwardly therethrough and into the reactor disengaging chamber 2. A standpipe 12 is provided for conveying stripped catalyst from the bottom of the stripping chamber 4 to the lower portion of the regeneration chamber 6. While only two riser-reactor conduits 8 and 10 are shown, it is to be understood that a plurality of riser conduits, say about 4, may be employed such that at least one or two of the riser conduits will discharge or terminate in the lower portion of the reactor chamber with the remaining riser conduits, say about 2, terminating in the upper portion of the reactor chamber. It is contemplated, however, of terminating all of the riser conduits in the lower portion of the reactor chamber as shown in the drawing. The reactor-disengaging chamber is an enlarged cylindrical chamber which may contain a relatively dense fluid bed of finely divided catalytic material 14 having an upper meniscus or level 16 or 18 as desired and depending upon the particular type of hydrocarbon conversion process being conducted therein as hereinbefore discussed. In the apparatus of FIGURE 1, the stripping chamber 4 is a cylindrical chamber contiguous with and positioned below the enlarged cylindrical reactor-disengaging chamber. The cylindrical chambers are in open communication with one another and the stripping chamber is connected to the reactor chamber by a baffle member 20 in the form of an inverted conical frustrum through which the plurality of riser conduits extend into the enlarged cylindrical reactor chamber. The stripping chamber 4 is provided with a plurality of downwardly sloping and alternately staggered baffle members 22 commonly referred to as "disc and donut" baffle members, the slope of which is at least 45° from the horizontal and preferably about 50° from the horizontal. A distributor ring 24 or other suitable distributing means connected to conduit 26 is positioned in the lower portion of the stripping chamber for the introduction of gasiform stripping material thereto which passes upwardly through the stripping chamber countercurrent to downwardly moving finely divided catalytic material. The finely divided catalytic material separated from reaction products in the reactor chamber and the stripping chamber are withdrawn from the lower portion of the stripping chamber and passed downwardly through standpipe 12 to a standpipe discharge outlet 28 having a vertically movable plug valve 30 aligned therewith for controlling the rate of catalyst discharged from the standpipe. Positioned substantially horizontally across the lower cross-section of the enlarged cylindrical regeneration chamber 6 and beneath the standpipe discharge outlet is positioned a perforated grid member 32 to provide for more uniform distribution of regeneration gas introduced beneath the grid to the bottom cross-sectional area of a bed of catalyst 34 maintained above the grid under regeneration conditions. Regeneration gas is introduced beneath grid 32 for passage upwardly therethrough by suitable distributor means shown as rings 36 and 38 connected to air heaters 40 and 42, respectively. Positioned in the lower portion of the reeneratgion chamber and extending upwardly from the dish shaped bottom thereof and through the grid means are at least two substantially vertical and cylindrical baffle members 44 and 46 which form wells surrounding the inlets to the risers 8 and 10, thereby forming an annular space therebetween. The well wall adjacent to the standpipe is increased in height to substantially reduce the tendency of contaminated catalyst discharged from the standpipe from passing directly into the well before it has been subjected to regeneration treatment. Positioned in the lower portion of each well is provided a suitable distributor means such as distributor rings 48 and 50 connected to conduits 52 and 54 respectively for introducing fluffing or stripping gas such as steam thereto. Positioned within each well and aligned with the riser inlet is provided suitable vertically movable hollow stem plug valves 56 and 58 connected to conduits 60 and 62, respectively, through which liquid and/or gasiform material may be introduced for mixing with regenerated catalyst, and thereafter, passing the mixture upwardly through the riser reactors 8 and 10 under desired conversion conditions. Conduits 64 and 66 connected to conduits 60 and 62, respectively, are provided for the purpose of introducing dispersion gasiform material such as steam or a suitable lift gas as the situation demands. The regenerator is provided with suitable heat exchange coils 68 for controlling regeneration temperatures, as herein discussed, which may be independently controlled for circulating cooling fluid therethrough. Regenerated catalyst is withdrawn from the relatively dense fluid bed of catalyst in the regeneration chamber and passed downwardly as an annular stream countercurrent to fluffing or stripping gas to the inlet of the riser conduits wherein the regenerated catalyst is mixed with gasiform material and passed upwardly through the riser-reactor conduits under desired conditions as herein discussed. Products of combustion resulting from regeneration of the catalyst by burning of carbonaceous deposits on the catalyst with air and containing entrained catalyst fines are removed from the upper portion of the regeneration chamber by conduit 70 after passing through suitable cyclone separator means 72 for the removal of entrained catalyst fines, which fines are returned to the relatively dense catalyst bed by diplegs 74. The riser-reactor conduits 8 and 10 extend substantially vertically from the lower portion of the regeneration chamber upwardly therethrough and into the reactor chamber with a substantial portion of the riser conduits lying outside of the regeneration chamber or the reactor chamber and thereby being readily accessible. In that portion of the riser conduit which is readily accessible and outside of the reactor or regenerator chamber there are provided a plurality of vertically spaced apart inlet nozzles connected to conduits 76', 76" and 76''' in riser 8 and conduits 78', 78" and 78''' with the nozzles in riser 10. Provision is also made for introducing a suitable gasiform material as dispersion gas to each nozzle in the riser conduits, as shown in the drawing. Gasiform material separated from finely divided catalytic material in the reactor disengaging chamber is passed through suitable cyclone separator equipment means designated 80 having dipleg 82 and thereafter the gasiform material is withdrawn from the upper portion of the chamber by conduit 84 for passage to suitable separation and recovery equipment, not shown. In addition to the above the conduits extending through the inverted dish shaped top of the regeneration chamber are provided with suitable expansion joints which may be bellows type extension joints to allow for expansion and contraction of the vertical conduits in the apparatus.

As a specific example of the apparatus of FIGURE 1 and a method of operating the same, the following is provided.

| | |
|---|---|
| Reactor, I.D | 22 ft. |
| Stripper. I.D | 11 ft. |
| Reactor-stripper height | 52 ft. |
| Regenerator, I.D | 34 ft. |
| Regenerator height | 38 ft. |
| Risers 8 and 10, I.D | 28 inches. |
| Standpipe, I.D | 28 inches. |
| Reactor temperature | 900° F. |
| Reactor pressure | 10 p.s.i.g. |
| Reactor bed density | 30#/cu. ft. |
| Stripper pressure (bottom) | 14.8 p.s.i.g. |
| Standpipe pressure (bottom) | 25.9 p.s.i.g. |
| Standpipe catalyst density | 30#/cu. ft. |
| Standpipe catalyst velocity | 6.4 ft./sec. |
| Regeneration temperature | 1100° F. |
| Regeneration pressure | 16.9 p.s.i.g. |
| Regeneration catalyst bed density | 30#/cu. ft. |
| Riser pressure inlet | 17.7 p.s.i.g. |
| Riser velocity | 76 ft./sec. |
| Catalyst circulation rate | 2,920,000#/hr. |

Figure 2:
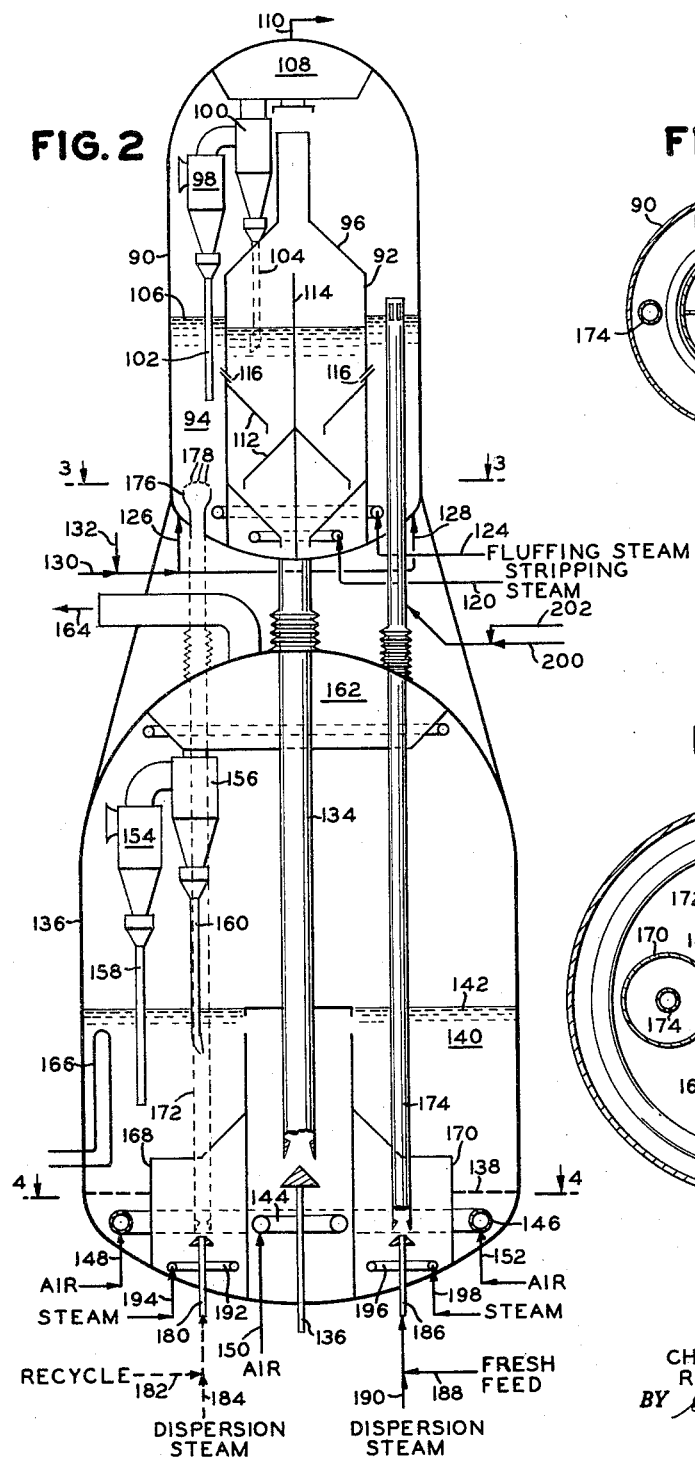

Referring now to FIGURE 2, a unitary substantially vertical vessel is provided having an upper cylindrical reactor chamber 90 containing a coaxially positioned cylindrical stripping chamber 92 of smaller diameter than the reactor chamber. The stripping chamber extends upwardly from the dish shaped bottom of the reactor chamber to the upper portion thereof, thereby forming an annular reactor space or compartment 94 therewith. The upper portion of the stripping chamber is capped by an inverted funnel shaped means 96 with the chimney portion of the funnel extending upwardly into the upper portion of the reactor chamber. In the upper portion of the reactor chamber there are provided a plurality of serially connected cyclone separator means 98 and 100 provided with diplegs 102 and 104 in which finely divided catalytic material entrained with gasiform products of reaction are separated from the gasiform products. The separated catalyst is then returned by the diplegs to a relatively dense fluid bed of catalyst having an upper level 106 in the annular space 94 around the stripping chamber. Separated gasiform products are passed from the cyclone separator means to an accumulation or plenum chamber 102 in the upper portion of the reactor chamber from which they are removed by conduit 110 and passed to suitable recovery equipment for separation into desired products, not shown. The stripping chamber is provided with a plurality of downwardly sloping and alternately staggered disc and donut shaped baffle member 112 which are perforated baffle members in the lower portion thereof to provide for intimate countercurrent contact of stripping gas with downwardly moving contaminated catalytic material withdrawn from the annular reactor chamber. It is contemplated, as shown in the drawing, of providing the stripping chamber with at least one or more substantially vertical transverse baffle members 114 extending from substantially the bottom of the cylindrical stripping chamber to the upper portion thereof in addition to the downwardly sloping annular baffle means whereby the stripping chamber is divided into two or more elongated stripping compartments. Provided in the upper intermediate portion of the wall of the stripping chamber are suitable slot means or passageways 116 for transferring contaminated catalytic material from the relatively dense fluidized annular bed in the reactor chamber to the stripping compartments in the stripping chamber. The specific location of the slot means 116 is of significant importance for the reasons more fully discussed hereinafter in conjunction with FIGURE 3. Positioned in the lower portion of the stripping chamber and beneath the lowermost annular baffle member is provided a distributor ring or means 118 supplied by condit 120 for introducing gasiform stripping agent to the lower portion of the stripping chamber for upward flow therethrough. There is also provided in the lower portion of the annular reactor compartment and substantially at the bottom thereof an annular distributor means or ring 122 supplied by conduit 124 for introducing fluffing gas or fluidizing gas to substantially the bottom portion of the annular bed of catalytic material maintained in the annular reactor chamber. Conduits 126 and 128 supplied by conduit 130 to which a gasiform stripping material may be added by conduit 132 are provided for introducing gasiform reactant material into the lower portion of the annular bed of catalyst and preferably above distributor ring 122.

A standpipe 134 for conveying catalyst is coaxially positioned within the vessel and extends substantially vertically downwardly from the bottom of the stripping chamber to and through an enlarged cylindrical regeneration chamber 136 therebelow. The standpipe extends to substantially the lower portion of the regeneration chamber with the discharge of catalyst from the bottom of standpipe 134 being controlled by a vertically movable plug valve 136 aligned with the bottom open end of the standpipe. Most usually the standpipe will terminate above a substantially horizontal grid means 138 positioned across the lower cross-sectional area of the regeneration chamber 136, however, the standpipe may be extended through and terminate below the grid 138. A relatively dense fluid bed of catalytic material 140 having an upper level or meniscus 142 is maintained above the grid means wherein the catalyst is regenerated by an oxygen-containing gas passing upwardly through the grid and into the catalyst bed which is introduced beneath the grid by suitable gas distributing means. In the apparatus of FIGURE 2 the regeneration gas distributor rings 144 and 146 supplied by conduits 148, 150 and 152 are positioned beneath the grid means for introducing regeneration gas across the bottom cross-sectional area of the catalyst bed and may be used alone or in conjunction with the distributor grid 138. Products of combustion obtained from regeneration of the catalyst and containing entrained finely divided catalytic material are withdrawn from the upper portion of the dense catalyst bed and passed through a plurality of serially connected cyclone separators designated 154 and 156 having diplegs 158 and 160 connected thereto which diplegs are employed for returning catalytic materal separated in the cyclones to the dense bed of catalytic material undergoing regeneration. The combustion gases or flue gases separated from catalytic material are then passed to a plenum chamber 162 in the upper portion of the regeneration chamber for withdrawal therefrom by conduit 164.

As a means of restricting regeneration temperatures to a desired level during regeneration of the catalytic material which involves combustion of carbonaceous deposits on the catalyst with an oxygen-containing gas, a plurality of bayonet type heat exchange coils designated 166 project into the dense bed of catalytic material and may be independently controlled for circulating a suitable heat exchange medium through the individual coil.

Extending substantially vertically upwardly from the dish-shaped bottom of the regeneration chamber and through the grid member 138 into the lower portion of the catalyst bed 140 are provided a plurality of cylindrical baffle members 168 and 170 open at their upper end, which baffle members will be referred to hereinafter as wells which provide means for withdrawing downwardly regenerated catalyst from the dense bed of catalytic material in the regeneration chamber. The cylindrical baffle means 168 and 170 defining the withdrawal wells are extended higher on the side adjacent to the standpipe discharge as a means for reducing any tendency of the contaminated catalyst being discharged from the standpipe and passing directly into the well before the catalytic material has been subjected to regeneration treatment. As discussed hereinafter in conjunction with FIGURES 3 and 4, there may be at least about 4 of these withdrawal wells provided in the apparatus described herein. Positioned within each well and extending from the lower portion thereof substantially vertically upwardly into the annular reactor chamber are riser conduits 172 and 174. Riser conduit 172 is shown terminating in the lower portion of the annular reactor chamber and is capped by a suitable discharge or distributing means. That is, the upper end of the riser conduit may be capped and provided with a plurality of elongated slots around the periphery of the standpipe and immediately below the capped end of the riser, which arrangement is sometimes referred to as a "bird cage" or the riser conduit may terminate in an enlarged section 176, which is capped by a perforated and curved baffle means 178. Riser conduit 176 on the other hand is shown terminating in the upper portion of the annular reactor space and above the upper dense phase level 106 of the bed of catalyst maintained therein. As more fully described hereinafter, there may be at least two riser conduits 172 which terminate in the lower portion of the annular bed employed in conjunction with two riser conduits 174 terminating above the upper dense phase catalyst bed level in the reactor chamber. Aligned with the bottom open end of riser conduit 172 is a vertically movable hollow stem plug valve 180 to which hydrocarbon reactant material may be introduced by conduit 182 and gasiform dispersion material introduced by conduit 184. Riser conduit 174 is also provided with a vertically movable hollow stem plug valve 186 aligned with the bottom open end of the riser conduit to which hydrocarbon reactant may be supplied by conduit 188 and gasiform dispersion material by conduit 190. Withdrawal well 168 is provided in the lower portion thereof with a distributor ring 192 supplied by conduit 194 for introducing fluffing gas or stripping gas to the lower portion of the well. Similar withdrawal well 170 is provided with a distributor ring 196 supplied by conduit 198 for introducing fluffing gas or stripping gas to the lower portion of the well.

Figure 3:
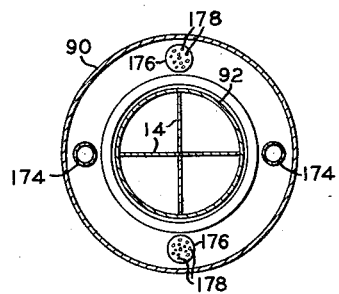
FIGURE 3 shows diagrammatically a plan view of the bottom of the reactor of FIGURE 2.

FIGURE 3 shows diagrammatically a cross-sectional view of the bottom of the reactor chamber for the apparatus of either FIGURE 1 or FIGURE 2, for the purposes of showing the relationship and positioning of the riser conduits with respect to the reactor chamber and the stripping chamber. In the discussion of FIGURE 3 it will be specifically directed, as applied to the apparatus of FIGURE 2, primarily for purposes of simplification for the use of reference numbers. The outer ring defines the wall 90 of the reactor chamber with the inner circle defining the wall 92 of the stripping chamber. Two riser conduits 174 are shown positioned diametrically opposed to one another with riser conduits 172 shown diametrically opposite one another such that the riser conduits are substantially 90° apart. The primary importance or significance of FIGURE 2 is specifically directed to the location of slot means 116 in the wall 92 of the stripping chamber, as well as the location of the substantially vertical transverse baffles separating the stripping chamber in one embodiment into four separate stripping compartments. It has been determined, as a result of extensive study and experimentation, that the slot means 116 may be preferably located to prevent the passage of hydrocarbon reactants into the stripper compartment before the hydrocarbon reactant has undergone sufficient conversion to desired products. Accordingly, as a result of this investigation and as shown in the sketch, a portion of the stripper wall adjacent to riser conduits 174 which extend into the upper portion of the annular reactor chamber should not be provided with slots in a segment defined by a 60° angle with the segment being equally proportioned on each side of the riser conduit. Accordingly, slot means may be provided in the upper portion of the stripper wall and above the uppermost annular baffle means provided therein such that the slots or passageways are in segment adjacent to the riser conduits 172.

Figure 4:
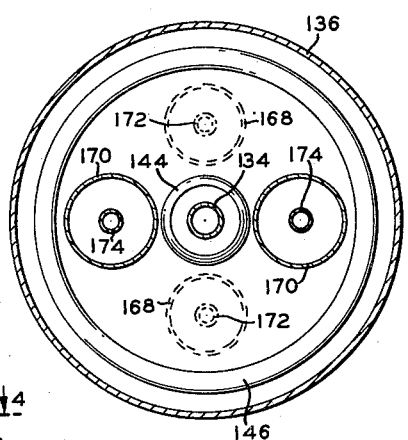
FIGURE 4 shows diagrammatically the plan view of the bottom of the regenerator of FIGURE 2.

FIGURE 4 shows in cross section the arrangement of apparatus of either FIGURE 1 or FIGURE 2 at the bottom of the regenerator vessel wherein, for example, 136 defines the regenerator wall, 146 is the outer annular regenerator air distributor ring, 144 is the inner annular air distributor ring, 134 is the standpipe coaxially positioned within the vessel, 172 identifies the preferred arrangement or location of the riser conduits which terminate in the lower portion of the reactor bed as shown in FIGURE 2, 168 identifies the withdrawal well surrounding risers 172, 174 identifies the preferred arrangement of the riser conduits which terminate above the upper level of the bed of catalyst in the reactor and 170 identifies the withdrawal wells surrounding the inlets of the risers 174.

The versatility of the apparatus disclosed and described herein may be amplified upon by referring to FIGURE 2 wherein it is contemplated, as discussed in connection with FIGURE 1, of adding hydrocarbon reactant to the risers by conduit 200 either with or without gasiform dispersion material introduced by conduit 202 to that portion of the riser conduit 174 lying between the regeneration chamber and the reaction chamber, as shown in FIGURE 2 of the drawing. When operating the apparatus of FIGURE 2 in this manner for the conversion of relatively high boiling hydrocarbons such as residual oils, reduced crudes or other relatively low API gravity materials, particularly those having an API gravity below about 15 API, relatively inert gas, such as steam, is initially employed as lift gas with the catalyst in the lower portion of the riser up to the point of introduction of hydrocarbon feed in the upper intermediate portion of the riser-reactor conduit. The hydrocarbon feed is admixed with the hot catalyst in the riser-reactor and subjected to the desired degree of conversion, depending upon the conditions of operation employed therein and thereafter the mixture is discharged above the upper level of an annular bed of catalyst in the reactor space. The mixture upon discharge from the riser-reactor 174, including products of reaction, are separated under reduced velocity conditions such that the contaminated catalyst settles out onto the annular bed of catalyst and the gasiform products of reaction are passed through suitable cyclone separator equipment in the upper portion of the vessel for separation of entrained catalyst fines from reaction products prior to the reaction products being removed from the vessel. In this particular arrangement of apparatus, the catalyst forms an annular bed of catalyst in the reactor space wherein it is subjected to a first stage stripping. In the first stage stripping compartment having a relatively dense fluidized bed of contaminated catalyst, the temperature may be varied as desired over a relatively wide range of temperature conditions by the use of riser conduit 172 as the means for passing hot freshly regenerated catalyst in the absence of hydrocarbon reactant into the annular first stage stripping compartment. By this arrangement of apparatus and sequence of treating steps, the temperature of the first annular stripping compartment, as well as the inner cylindrical stripping chamber, may be maintained equal to, above or below the conversion temperature employed in the riser-reactor. The catalytic material subjected to first stage stripping in the annular stripping compartment is then passed through suitable slots or passageways 116 in the wall of the cylindrical stripping chamber to the second stripping chamber or compartment wherein additional stripping of the catalyst is accomplished prior to returning the catalyst by standpipe 134 to the regeneration compartment. This improved arrangement of apparatus and sequence of steps to effect a high temperature and prolonged stripping treatment of the catalyst to remove contaminants therefrom effectively removes adsorbed hydrocarbons not readily vaporized by a combination of steps involving the soak cracking of adsorbed hydrocarbons at an elevated temperature and in the presence of a relatively large amount of stripping gas, which is employed to remove cracked products of reaction from the catalyst as rapidly as possible and simultaneously reduce the partial pressure of the hydrocarbon undergoing treatment and increasing its susceptibility to conversion of desired products, thereby minimizing the quantity of adsorbed carbonaceous material passed to and burned in the regeneration step.

It is evident, therefore, from the description presented herein the applicants have provided an apparatus of unprecedented flexibility and versatility in their method of operation for converting a wide variety of dissimilar hydrocarbon feed materials to high yields of desired products.

Having thus generally described the method and apparatus of this invention, as well as preferred embodiments thereof, it is ot be understood that no undue restrictions are to be imposed as a result thereof, since minor modifications to the apparatus may be made without departing from the scope of the invention.

We claim:

1. A method for converting relatively high-boiling hydrocarbon feed materials in the presence of finely divided fluidizable solid material which comprises passing at least one first confined stream of solids as a suspension substantially vertically upwardly from a regeneration zone under elevated temperature conversion conditions into a reaction zone, introducing a hydrocarbon reactant into one of a series of inlet points in said first confined stream, discharging said first confined stream in said reaction zone above a dense fluidized bed of solid material therein under conditions to separate solid material from hydrocarbon product material by settling, passing at least one second confined stream of solids as a suspension substantially vertically upwardly from said regeneration zone under elevated temperature conversion conditions to the lower portion of said reaction zone, introducing a hydrocarbon reactant into at least one of a series of inlet points in said second confined streams, discharging finely divided solids and hydrocarbon material from said second confined stream into said reaction zone under conditions to separate finely divided solids from hydrocarbon, passing finely divided solids from said reaction zone to a stripping zone for downward flow therein counter-current to stripping gas introduced to the lower portion thereof, passing solids from the lower portion of said stripping zone as a confined stream downwardly to the lower portion of a regeneration zone, heating said solids in a fluid bed condition in said regeneration zone to an elevated temperature and passing the thus heated solids to said first and second confined streams of solids being passed to said reaction zone.

2. The method of claim 1 wherein a high-boiling hydrocarbon is converted in at least one confined stream discharging above said fluid bed of solids in said reaction zone and at least one of said confined streams is employed to convey solids at an elevated temperature from said regeneration zone into the lower portion of said bed of solids in said reaction zone, introducing relatively inert gaseous material to the lower portion of said fluid bed, passing finely divided solids from said fluid bed of solids into a stripping zone containing a fluid bed of solids therein, passing a second relatively inert gaseous material upwardly through the fluid bed of solids in said stripping zone and recovering hydrocarbon products of reaction and gaseous material from the upper portion of said reaction zone.

3. The method of claim 1 wherein a gas oil feed material is cracked at an elevated temperature in said first confined stream and a recycle oil feed is passed through said second confined stream and discharges into the lower portion of said fluid bed of contact material in said reaction zone.

4. The method of claim 1 wherein a residual oil is cracked in said confined streams and said streams discharge above the upper level of a fluid bed of solid material maintained in the lower portion of said reaction zone.

5. The method of claim 1 wherein relatively inert gaseous material is initially employed with the finely divided solid material to form a suspension passing upwardly through said confined streams and a residual oil hydrocarbon feed material is introduced into the suspension in said confined streams external to said regeneration zone and below the discharge of said confined streams in said reaction zone.

6. The method of claim 1 wherein the temperature of the fluid bed of contact material in said reaction zone is above the temperature of the contact material discharged above the fluid bed from said confined stream.

7. The method of claim 1 wherein the solid material is a mixture comprising a major proportion of a relatively inert catalytic material with a minor amount of relatively active catalytic material.

8. The method of claim 1 wherein the solid material passed to said regeneration zone from said stripping zone is first contacted with an oxygen-containing gaseous material in a confined upflow regeneration section and thereafter contacting the solid material in a relatively dense fluid bed which moves generally downwardly with additional oxygen-containing gas prior to passing said solid material to said confined streams.

9. A unitary apparatus comprising in combination an upper reactor chamber, a stripping chamber and a lower regeneration chamber, at least one open end riser conduit extending from within the lower portion of said regeneration chamber substantially vertically upward and terminating within the lower portion of said reactor chamber, at least one substantially vertical open end riser conduit extending from within the lower portion of said regeneration chamber upwardly into the upper portion of said reactor chamber and terminating above a relatively dense fluid bed of contact material maintained in said reactor chamber, each of said riser conduits provided with at least one inlet means for introducing a gasiform material to said riser conduit above the bottom open end thereof, means for passing finely divided solid contact material from said dense fluid bed in said reactor chamber to said stripping chamber for downward flow therein, means for introducing a gasiform material to the lower portion of said stripping chamber, at least one substantially vertical open end standpipe extending from the bottom of said stripping chamber to the lower portion of said regeneration chamber, distributor means for introducing gaseous material to the lower portion of a relatively dense fluid bed of contact material in said regeneration chamber, a vertically movable plug valve aligned with the bottom open end of said standpipe, and vertically movable hollow stem plug valves aligned with the bottom open end of said riser conduits.

10. The apparatus of claim 9 wherein the stripping chamber is a cylindrical chamber confined within said reactor chamber, thereby forming an annular reactor section therewith, said cylindrical stripping chamber being capped by an inverted funnel shaped baffle member which is in open communication with the upper portion of said reactor chamber above a relatively dense fluid bed of contact material maintained in said annular reactor section.

11. The apparatus of claim 9 wherein the stripping chamber is of smaller diameter than said reactor chamber extending downwardly therefrom and connected to the bottom of said reactor chamber by a conical frustrum baffle member.

12. The apparatus of claim 9 wherein the bottom open end of said riser conduits originate within separate cylindrical chambers open at their upper ends which extend upwardly from the bottom of said regeneration chamber into a relatively dense fluid bed of contact material in said regeneration chamber.

13. The apparatus of claim 9 wherein the lower portion of the standpipe is surrounded by a cylindrical baffle member which extends upwardly from the bottom of said regeneration chamber to substantially the upper level of a relatively dense fluid bed of contact material in said regeneration chamber thereby forming a first annular regeneration section and the upper open end of said cylindrical baffle member being capped by a spaced apart impervious baffle member.

14. The apparatus of claim 9 wherein the plurality of riser conduits are substantially uniformly spaced around the vessel with the riser-reactors terminating in the upper portion of the reactor chamber being substantially opposite one another.

15. The apparatus of claim 9 wherein a portion of the riser conduits are external to the reactor chamber and the regeneration chamber and are provided with a plurality of separate means for introducing gasiform material to the risers.

16. The apparatus of claim 10 wherein the stripping chamber wall is provided with a perforated area and a non-perforated area, said perforated area constituting a plurality of passageways for transferring finely divided solid contact material from said reactor chamber to said stripping chamber, said non-perforated area being defined by a 60° arc of a circle which lies adjacent to the risers terminating in the upper portion of the reactor chamber and said stripping chamber being provided with at least one substantially vertical transverse baffle member.

17. The apparatus of claim 9 wherein the risers discharging in the lower portion of the reactor chamber terminate in an expanded section at the riser discharge which is perforated in the upper portion thereof.

18. The apparatus of claim 11 wherein the plurality of risers extend through said conical frustrum baffle member.

References Cited in the file of this patent

UNITED STATES PATENTS

| | | |
|---|---|---|
| 2,428,873 | Gunness et al. | Oct. 14, 1947 |
| 2,459,824 | Leffer | Jan. 25, 1949 |
| 2,589,124 | Packie | Mar. 11, 1952 |
| 2,727,810 | Leffer | Dec. 20, 1955 |
| 2,871,186 | Francisco et al. | Jan. 27, 1959 |
| 2,891,001 | Wickham et al. | June 16, 1959 |
| 2,895,811 | Schaaf | July 21, 1959 |
| 2,900,325 | Rice et al. | Aug. 18, 1959 |